United States Patent [19]

Bartel

[11] Patent Number: 4,949,804

[45] Date of Patent: Aug. 21, 1990

[54] PROTECTIVE CONTROL SYSTEM FOR POWER DOOR LATCH

[75] Inventor: Peter Bartel, Hattingen, Fed. Rep. of Germany

[73] Assignee: Kiekert GmbH & Co. Kommanditgesellschaft, Heiligenhaus, Fed. Rep. of Germany

[21] Appl. No.: 298,595

[22] Filed: Jan. 18, 1989

[30] Foreign Application Priority Data

Jan. 21, 1988 [DE] Fed. Rep. of Germany ....... 3801650

[51] Int. Cl.$^{5}$ .............................................. B60R 21/00

[52] U.S. Cl. ..................................... 180/281; 180/282

[58] Field of Search ................................ 180/281, 282

[56] References Cited

U.S. PATENT DOCUMENTS

| | | | |
|---|---|---|---|
| 3,575,604 | 4/1971 | Smith | 180/281 |
| 3,722,615 | 3/1973 | Okada et al. | 180/281 |
| 4,679,508 | 7/1987 | Fruehan et al. | 180/281 |
| 4,821,836 | 4/1989 | Evans | 180/281 |

OTHER PUBLICATIONS

Intel Automotive Handbook, Eprom 27 C 64, pp. 6-1--6-14, Dec. 1987.

Intel Hardware Description of 80 C 51—Automotive, pp. 11-1-11-16.

Intel Preliminary—MCS—51 80 C31BH—Automotive, pp. 14-59-14-90.

Intel—Automotive 87C51GB—Automotive—pp. 14-9-1-14-104.

Toshiba—'87 Automotive Use Bipolar IC's Data Book Bit-Electronic Integrated Circuit Technical Data—pp. 36-43.

National Semiconductor Corporation—Linear Databook—Operational Amplifiers/Buffers LM741, pp. 3-257-3-278.

*Primary Examiner*—Kenneth R. Rice

*Attorney, Agent, or Firm*—Herbert Dubno; Andrew M. Wilford

[57] ABSTRACT

A safety system used in combination with a vehicular power door latch has a mechanism operated by a motor in turn driven by a drive apparatus for opening and closing vehicle door. The safety system comprises a vehicle speed sensor generating an output when vehicle speed exceeds a predetermined limit, a counter startable when the motor is actuated, and a controller connected between the speed sensor and the counter and to the apparatus for shutting down the apparatus and thereby deenergizing the motor when the vehicle-speed output exceeds the limit and when the counter has counted since the motor started beyond a predetermined limit.

10 Claims, 3 Drawing Sheets

PROTECTIVE CONTROL SYSTEM FOR POWER DOOR LATCH

FIELD OF THE INVENTION

The present invention relates to a control system for a power door latch of an automotive vehicle. More particularly this invention concerns such a controller intended to protect the lock and to provide additional safety features for a vehicle equipped with such a lock.

BACKGROUND OF THE INVENTION

A standard power door latch for an automotive vehicle such as described in U.S. Pat. 4,518,180 or in co-pending patent application No. 218,238 filed 12 July 1988, (now U.S. Pat. No. 4,892,339) has a rotary latch fork normally carried on the door post and operated by a motor to engage around a bolt projecting from the door edge both to pull the door closed and to push it open. Such a latch allows the door to be closed very tightly without, however, the user of the door having to slam it.

Although such latches have been known to be provided with child-proofing devices, it is still possible to operate their main switches while the vehicle is moving, allowing a door to open. In addition the latches are tempting for children to play with, so it is possible for a child to actuate such a latch while th vehicle is stationary to the point where its motor burns out.

Another disadvantage of these latches is that they can shut on the user's clothing or fingers and will attempt to close and clamp them tightly, potentially injuring the person, damaging his or her clothing, or jamming the latch. Frequently the latches are set to overload and stop only if they are exerting sufficient force to cause considerable injury, as the force necessary to close a tightly fitting door under the best of circumstances is considerable.

OBJECTS OF THE INVENTION

It is therefore an object of the present invention to provide an improved power-latch control system.

Another object is the provision of such an improved power-latch control system which overcomes the above-given disadvantages, that is which prevents accidental dangerous operation of the power door latch, which avoids injury to a user of it, and which is protected against burnout.

SUMMARY OF THE INVENTION

The instant invention is a safety system used in combination with a vehicular power door latch having a mechanism operated by a motor in turn driven by a drive apparatus for opening and closing vehicle door. The safety system comprises a vehicle speed sensor generating an output when vehicle speed exceeds a predetermined limit, a counter startable when the motor is actuated, and a controller connected between the speed sensor and the counter and to the apparatus for shutting down the apparatus and thereby making it impossible to energize the motor when the vehicle-speed output exceeds the limit and when the counter has counted since the motor started beyond a predetermined limit.

Thus with the system of this invention when the vehicle is under way the door latches cannot be operated. This makes accidentally opening a door in a moving vehicle impossible. In addition after a certain amount of operation the door latches are shut off, so that if the door is jammed open or someone is excessively pressing the close or open button, this action will not overheat and burn out the motor.

The speed sensor according to the invention detects wheel speed or motor speed.

In addition the system of this invention has an emergency switch connected to the apparatus and actuatable to reverse the motor when the switch is actuated and the motor is closing the door. Thus if a user's hand or clothing is caught in the door, he or she can override the normal control circuitry and reopen the door, even if it has not yet fully closed. This is in contradistinction to many systems which only allow the motor to be reversed once the door if fully closed.

In addition a motor protect device is provided connected to the apparatus for disconnecting same when the motor temperature exceeds a predetermined limit. This protective device includes a temperature sensor on the motor. Furthermore a standby device is provided that is actuated on operation of the motor protect device for checking the functions of the apparatus and controller. Such a standby device can also be actuated on operation of the apparatus.

A plurality of such latches according to this invention can be connected to a single such controller and have respective motor protect device connected to the respective apparatuses for disconnecting same when the respective motor temperatures exceeds a predetermined limit. It is also possible for this system to respond to the standby device, emergency switch, or other over-ride device.

DESCRIPTION OF THE DRAWING

The above and other objects, features, and advantages will become more readily apparent from the following, reference being made to the accompanying drawing in which.

SPECIFIC DESCRIPTION

Figure 1:
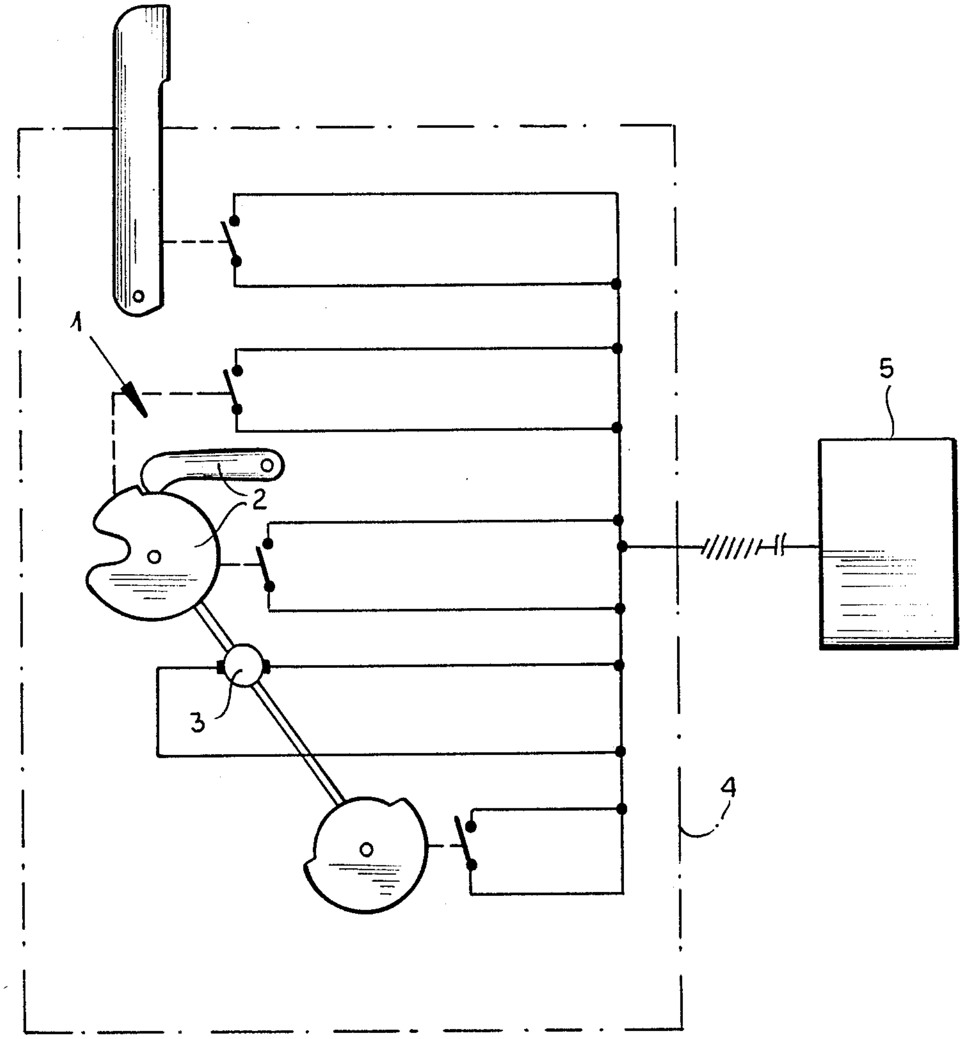
FIG. 1 is a mainly schematic block diagram of the door latch arrangement of this invention.

As seen in FIG. 1 a motor-vehicle door latch 1 has a mechanism 2 operated by a servomotor 3 and operated by a drive apparatus 4 to latch and open the door. In addition the drive apparatus 4 is provided with an electronic safety system 5 which can shut it down according to this invention.

Figure 2:
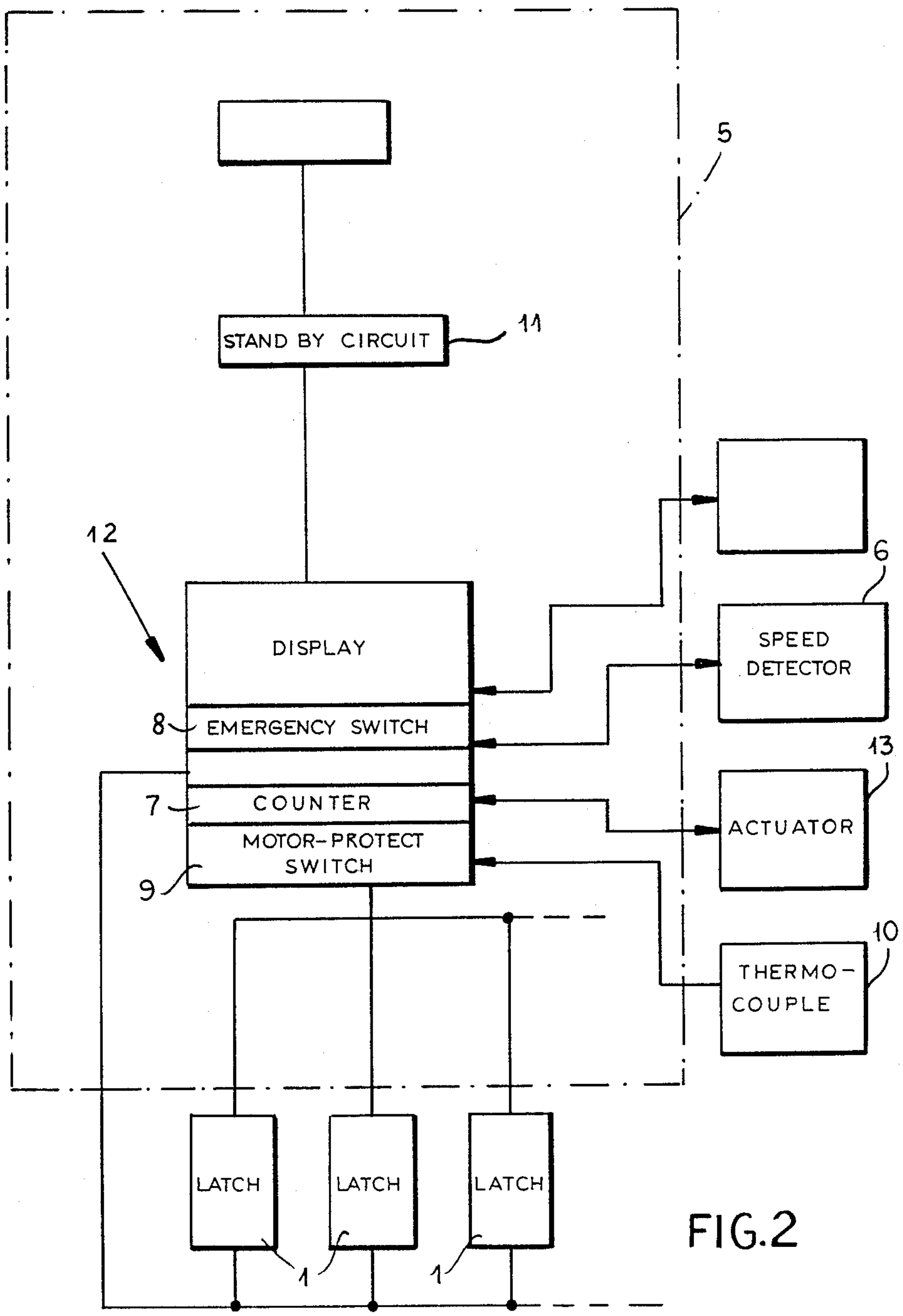
FIG. 2 is a block diagram of the control system of the latch of FIG. 1.

As seen in FIG. 2 the system 5 is connected to a speed detector 5 which may be connected to the vehicle tachometer, may be part of the on-board antilock brake system, or may be a specific sensor provided in one of the wheels or on the vehicle drive shaft. The system 5 automatically shuts off the apparatus 4 when the vehicle speed exceeds a predetermined threshold. This is most easily done by generating via a pulse generator an analog output whose frequency is proportional to vehicle speed and which is compared with a reference value and, when the analog actual-value frequency output exceeds the reference value, generating an error signal which is used to operate a relay or the like and shut off the apparatus 4, thereby preventing the door from being opened. In addition the motor 3 has an electronic counter 7 which is actuated when the motor 3 starts and which shuts off the motor 3 after a predetermined count or interval.

In order to further improve the safety of the arrangement, the safety system 5 is provided with an emergency switch 8 normally mounted right on the door of the latch 1 and operable to change closing action of the motor 3 into opening motion, in case something gets caught in the door. In order to avoid excessive actuation from ruining the motor 3 the system 5 is provided with a motor protecting switch 9 connected to a thermocouple 10 right on the motor 3 and serving to shut the apparatus 4 down when the motor 3 gets too hot. Such a switch 9 includes a reference-value generator whose output is fed to an input of a comparator having another input connected to the thermocouple and set to generate a shutdown signal with the thermocouple output exceeds the reference value. Finally the system has a stand-by circuit 11 which automatically checks all functions on operation of the apparatus 4 or on reaching of the predetermined threshold temperature and a display 12 showing all the operating parameters such as which doors are latched of the system.

Figure 3:
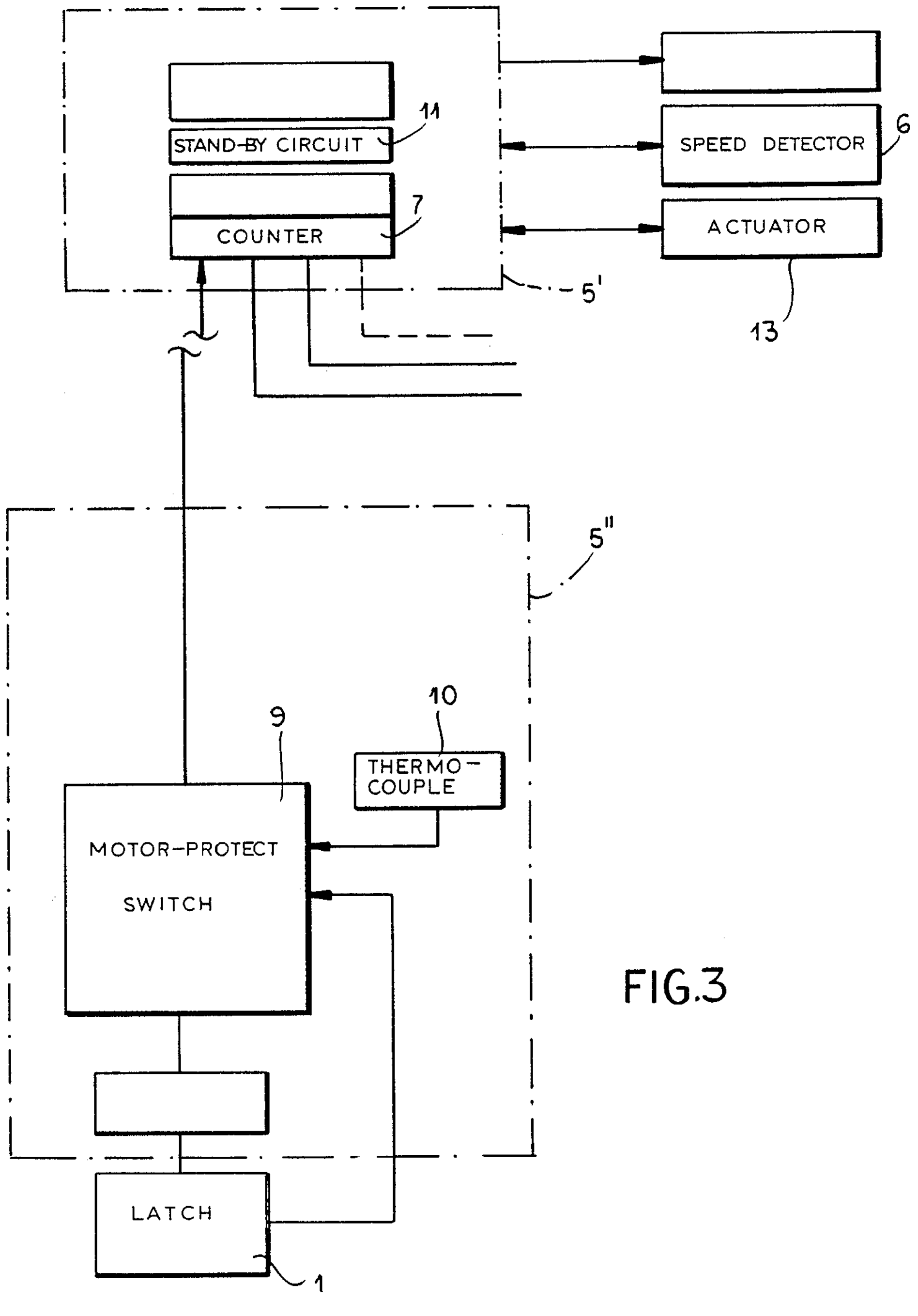
FIG. 3 is a block diagram of an alternative control system.

In FIG. 2 the safety system is a central setup which serves all of the various door latches 1. It can be integrated into the normal on-board computer or can be a separate unit. It is also possible as shown in FIG. 3 to have a decentralized system. Thus the counter 7 and standby system 11 are centrally positioned in a unit 5' itself connected to the speed detector 6 and the central latching controller 13 of the vehicle while each latch 1 has its own sensor 10 and protect switch 9 at a separate unit 5" right at the door.

I claim:

1. In combination with a vehicular power door latch having a mechanism operated by a motor in turn driven by a drive apparatus for opening and closing vehicle door, a safety system comprising:

a vehicle speed sensor generating an output when vehicle speed exceeds a predetermined limit;

a counter startable when the motor is actuated; and control means connected between the speed sensor and the counter and to the apparatus for shutting down the apparatus and thereby deenergizing the motor when the vehicle-speed output exceeds the limit and when the counter has counted since the motor started beyond a predetermined limit.

2. The combination defined in claim 1 wherein the speed sensor detects wheel speed.

3. The combination defined in claim 1 wherein the speed sensor detects motor speed.

4. The combination defined in claim 1, further comprising emergency switch means connected to the apparatus and actuatable to reverse the motor when the switch means is actuated and the motor is closing the door.

5. The combination defined in claim 1, further comprising motor protect means connected to the apparatus for disconnecting same when the motor temperature exceeds a predetermined limit.

6. The combination defined in claim 5 wherein the motor protect means includes a temperature sensor on the motor.

7. The combination defined in claim 6, further comprising stand-by means actuated on operation of the motor protect means for checking the functions of the apparatus and control means.

8. The combination defined in claim 1, further comprising stand-by means actuated on operation of the apparatus for checking the functions of the apparatus and control means.

9. The combination defined in claim 1 wherein a plurality of such latches are connected to a single such control means.

10. The combination defined in claim 1 wherein a plurality of such latches are connected to a single such control means and have respective motor protect means connected to the respective apparatuses for disconnecting same when the respective motor temperatures exceeds a predetermined limit.

* * * * *